March 11, 1924.

R. W. McINTYRE

MACHINE FOR CLOSING THE ENDS OF CARTONS

Filed April 17, 1922    5 Sheets-Sheet 3

INVENTOR
Rex W. McIntyre
by
Arthur B. Jenkins
ATTORNEY

March 11, 1924.

R. W. McINTYRE 1,486,151

MACHINE FOR CLOSING THE ENDS OF CARTONS

Filed April 17, 1922 5 Sheets-Sheet 4

March 11, 1924.

R. W. McINTYRE

MACHINE FOR CLOSING THE ENDS OF CARTONS

Filed April 17, 1922   5 Sheets-Sheet 5

1,486,151

Patented Mar. 11, 1924.

1,486,151

UNITED STATES PATENT OFFICE.

REX W. McINTYRE, OF SOUTH MANCHESTER, CONNECTICUT, ASSIGNOR TO THE ORFORD SOAP COMPANY, OF MANCHESTER, CONNECTICUT, A CORPORATION OF CONNECTICUT.

MACHINE FOR CLOSING THE ENDS OF CARTONS.

Application filed April 17, 1922. Serial No. 554,130.

*To all whom it may concern:*

Be it known that I, REX W. McINTYRE, a citizen of the United States, and a resident of South Manchester, in the county of Hartford and State of Connecticut, have invented a new and improved Machine for Closing the Ends of Cartons, of which the following is a specification.

My invention relates to the class of machines that are employed to secure bottoms and covers to the ends of tubes comprising, when completed, cartons for the reception of various materials, usually in a more or less comminuted state, and an object of my invention, among others, is to provide a machine of this class by means of which the closures comprising the bottoms and tops of such cartons may be rapidly and efficiently secured in place.

One form of machine embodying my invention and in the construction and use of, which the objects herein set out, as well as others, may be attained, is illustrated in the accompanying drawings, in which—

My improved machine illustrated and described herein is employed for closing both ends of a tube to form a carton thereof, the end of the carton comprising the bottom of the tube being first secured in place, and the end comprising the top being afterward secured in place and after the carton has been filled with the material for which it is made. The illustration and description herein is confined to the operation of the machine for securing the covers in place, it being understood, however, that the mechanism is employed for securing the bottoms of the cartons as well.

Figure 1:
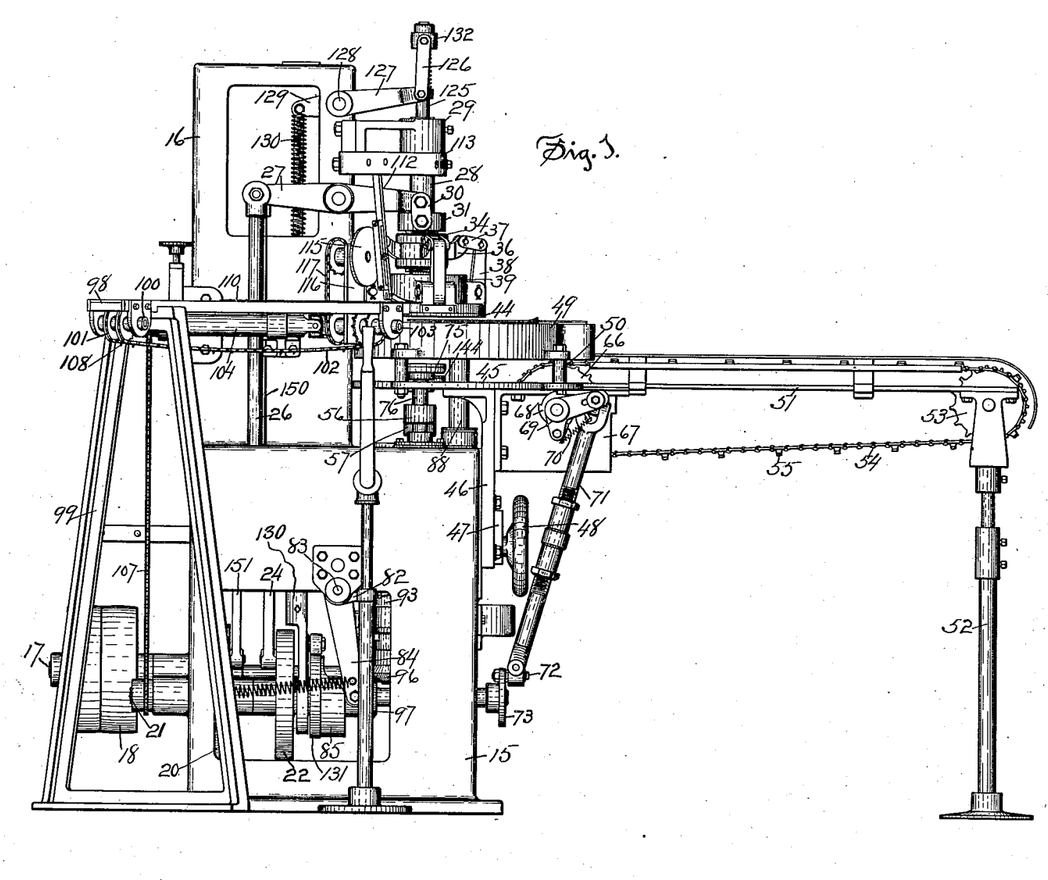
Figure 1 is a view in side elevation of my improved machine.

In the accompanying drawings the numeral 15 denotes the standard of my improved machine that is in the form of a case inclosing the driving mechanism and which case may be partially open, as illustrated in Figure 1, if desired. A support 16, also in the form of a case, is secured to and rises from the table comprising the top of the standard for the purpose of supporting certain parts of the operating mechanism a portion of such mechanism also being supported on said table. A driving shaft 17 extends into the case comprising the standard 15 and is rotatably mounted in bearings of any suitable construction therein, driving pulleys 18 being secured to the shaft preferably outside of the case, and as shown in Figure 1 of the drawings. A pinion 19 is secured to the driving shaft and meshes with a gear 20 secured to a cam shaft 21 also suitably mounted in bearings within the case comprising the standard 15, and also projecting outside of the case for a purpose to be hereinafter described, A cover guide actuating cam 22 secured to the cam shaft is employed for the purpose of operating guides for the carton in its movement to receive the cover, this cam having a cam groove 23 in its side face to receive a roller mounted on a stud projecting from the side of a carton guide frame 24 pivotally mounted on a stud 25 secured to an ear projecting from a side wall of the standard 15. This guide frame, in the structure herein shown, is of triangular shape and it is pivotally connected at one corner with a carton guide actuating rod 26 that extends upwardly to a carton guide actuating lever 27 pivotally mounted on the side of the support 16 and to which lever said rod is pivotally connected as shown in Figure 1 of the drawings. The opposite end of this lever is forked, its branches extending on opposite sides of a supporting sleeve 28 secured at its upper end within a bracket 29 projecting from the support 16 to which said bracket is secured in any suitable manner. Links 30, pivoted to each of the branches of the lever 27, are also pivotally connected to a flange 31 of a carrier sleeve 32 slidably mounted on the supporting sleeve 28 and having secured thereto, as by means of interengaging screw threads, a carton former actuating support 33 adapted to receive a carton former actuator 34. This actuator is located in a groove formed by the support 33 and a nut 35 secured to the screw threaded portion of the sleeve 32, and as clearly shown in Figure 7 of the drawings. Carton former actuating arms 36, preferably four in number, project radially from the actuator 34 and links 37 connect said arms with carton former actuating levers 38 pivotally mounted in ears projecting from a die block 39 secured, as by means of intermeshing screw threads, to the lower end of the supporting sleeve 28.

Figures 7, 8, 9, 10, 11:
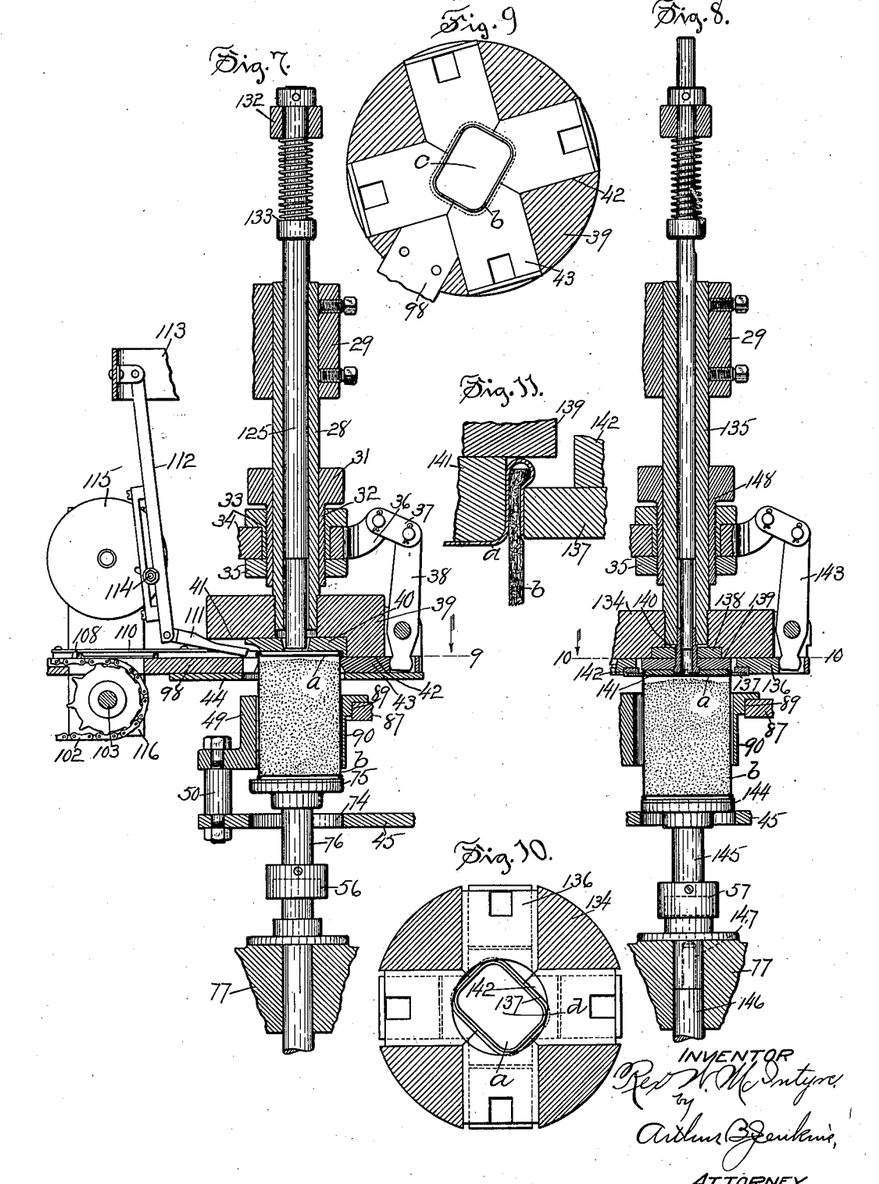
Figure 7 is a detail view in vertical section on a plane denoted by the dotted line 7—7 of Figure 5, and illustrating the manner of placing the covers within the open end of the carton.
Figure 8 is a view in vertical section on a plane denoted by the dotted line 8—8 of Figure 5 and illustrating the mechanism for securing the covers.
Figure 9 is a detail view, scale enlarged in horizontal section, illustrating the guides for the cartons while having the covers placed in position therein.
Figure 10 is a view similar to Figure 9 but illustrating the mechanism for securing the covers to the cartons, the head piece and the anvil being removed.
Figure 11 is a detail view, scale still further enlarged, illustrating the manner of securing the covers in place.

The die block 39 has a recess to receive a carton die 40 that is inserted into said recess as through a slot 41 extending from one edge of the block, and as shown in Figure 7 of the drawings. Guide slots 42, preferably four in number, are formed in the under surface of the die block 39, carton formers 43 being mounted for reciprocating movement in said slots, these formers having recesses to receive the lower ends of the carton guide actuating levers 38, and as shown in Figures 7 and 9 of the drawings, said recesses being preferably closed by plates secured to the ends of the formers. These formers are held in place as by means of a carton former holding plate 44 secured to the under side of the block 39.

The carton die 40 has a cover receiving recess in its under surface with a slot opening from said recess to the edge of the die so that a cover $a$ may be passed through said slot into said recess, the latter conforming closely to the shape of the cover. The formers 43 are shaped at their working ends to fit the corners of a carton, as clearly shown in Figure 9 of the drawings, the notches in the four corners preferably forming a support for the carton entirely around it.

Figure 5:
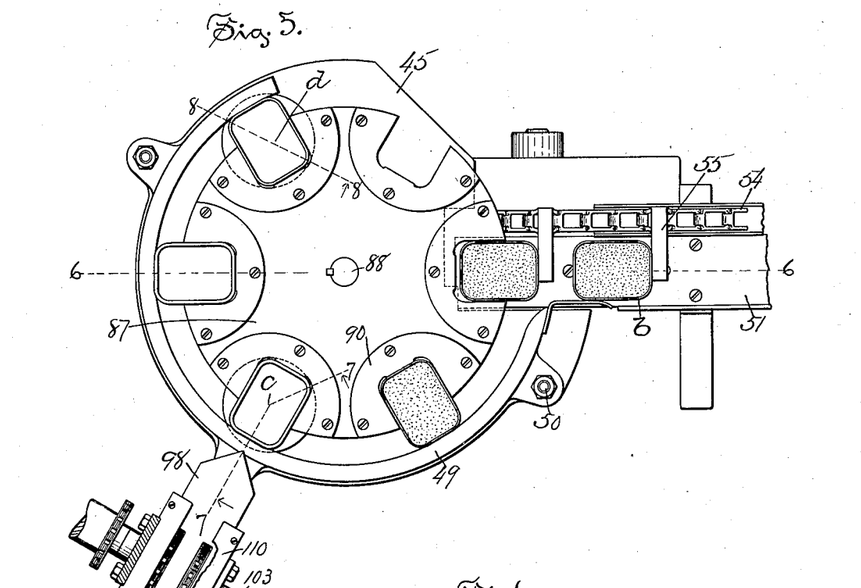
Figure 5 is a detail view, scale enlarged, showing the mechanism for positioning the cartons for the respective operations performed thereon, with the ejector cam removed.
Figure 6:
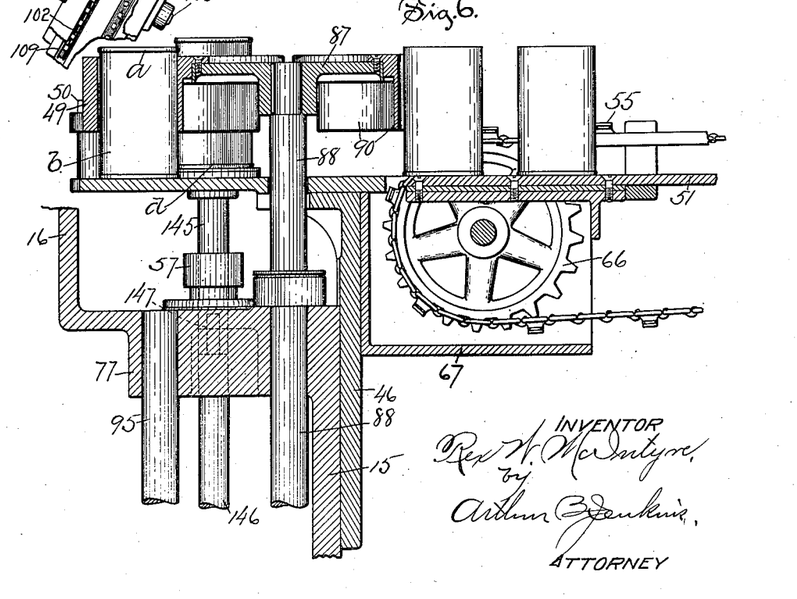
Figure 6 is a detail view in vertical section on a plane denoted by the dotted line 6—6 of Figure 5.

A carton supporting plate 45 is secured to the upper end of a bracket 46 adjustably secured to the side of the standard 15 and extending preferably substantially across said side. This bracket is vertically adjusted by means of a rack 47 secured in any suitable manner to the face of the bracket, substantially at its crosswise center, and having a pinion (not shown) secured to the hub of a bracket adjusting hand wheel 48 mounted in any suitable manner to rotate in the standard 15 and by means of which hand wheel the bracket may be vertically adjusted. A carton guide 49 is supported by the plate 45, in the structure herein shown posts 50, secured at their lower ends to the plate 45, locating the guide 49 with its lower edge spaced from said plate. A carton track plate 51 is secured at one end in any suitable manner to the plate 45 and is supported at its outer end upon a post 52, the post having means for affording vertical adjustment for this end of the plate. The post also has bearings for a stud upon which a sprocket wheel 53 is mounted to receive a carton feed 54 in the shape of a sprocket chain having fingers 55 projecting laterally therefrom and spaced to receive cartons $b$ therebetween, and as shown in Figures 5 and 6 of the drawings.

A sprocket wheel 66 is mounted in a box 67 secured to the bracket 46, this sprocket wheel being intermittently operated by means of a ratchet and pawl device and comprising a ratchet 68 secured to the shaft of the sprocket wheel and having a ratchet lever 69 mounted to rotate freely on said shaft and having a pawl 70 to engage the teeth of the ratchet, and as shown in Figure 1 of the drawings. The lever 69 is actuated as by means of a carton feed rod 71 pivotally connected at one end to the lever and at its opposite end to a crank pin 72 projecting from the side of a plate 73 secured to the shaft 21, the mechanism just described affording means whereby a step-by-step feed of the cartons $b$ along the track plate is provided.

The carton supporting plate 45 has a hole 74 within which a stool 75 is adapted to be located, said stool being supported on the upper end of a stool actuating post 76 mounted for vertical reciprocating movement in a thickened portion or boss 77 of the table at the top of the standard and in a web 78 projecting from inside of the lower end of the standard. See Figure 3. A rigid collar 79 is secured to the post 76 to receive the thrust of stool actuating springs 80 interposed between said rigid collar and a movable collar 81 mounted for reciprocating movement on the lower end of the post 76. This actuating collar has pins engaging the end of a forked stool actuating arm 82 secured to a rock shaft 83 mounted in suitable bearings in the standard 15. A rock shaft actuating arm 84 is secured to the shaft 83 and has a roller that is pressed by means of a spring into contact with a stool actuating cam 85 secured to the crank shaft 21. Guide bolts 86 may be employed to guide the movement of the collar 81 if desired. A stop collar 56 is secured to the post 76 to engage a suitable stop on the boss 77 and thereby limit the downward movement of the post 76 and properly position the stool 75 to receive the cartons.

A carton positioning wheel 87 is secured to the upper end of a carton positioning shaft 88 mounted to rotate in the boss 77 and in the web 78, this wheel having notches 89 to receive recessed plates 90 within the recesses in which the cartons are received as they are moved along the track plate 51 and from which plate the cartons are moved by the wheel in a circular path and into position to receive the covers and to have the covers secured in place, as will be hereinafter more particularly set out in detail.

The wheel 87 has a step-by-step movement imparted to it for the purpose of moving the cartons and positioning them for the different operations. This step-by-step movement may be imparted by any desirable mechanism the well known Geneva movement being employed herein and for which reason a brief description only will be required herein as it will be readily understood. This movement comprises a driven member 91 secured to the lower end of the shaft 88 and having the usual recesses 92 in its periphery, which recesses are engaged by the driving member 93 of the movement, which member comprises a roller 94 adapted to engage within the recesses 92 at each rotation of the driven member, whereby a one-step movement is imparted to the driven member 91 and consequently the wheel 87 at each complete rotation of the driving member 93. This latter member is secured to a connecting shaft 95 mounted in bearings suitably arranged in the standard and with its lower end having a bevel gear 96 meshing with a bevel gear 97 secured to the cam shaft 21.

Figures 2, 12, 13:
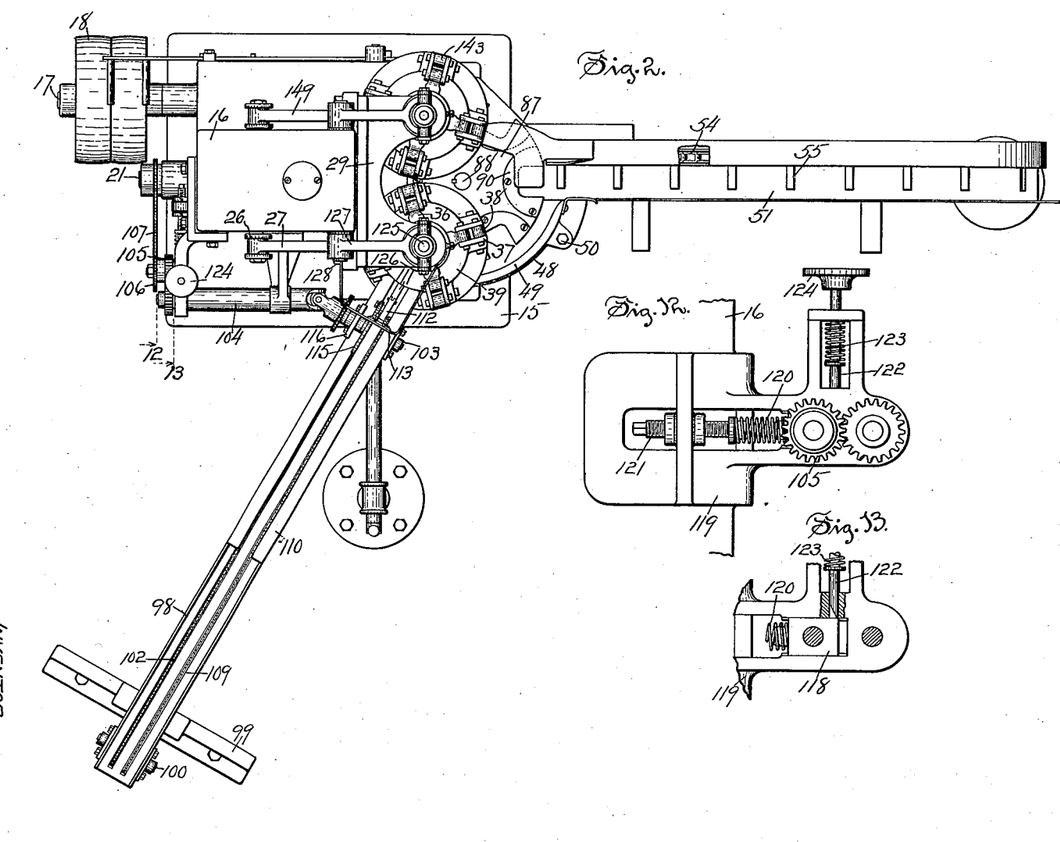
Figure 2 is a top view of the same, the carrier chain, however, not being strictly accurately shown as to details.
Figure 12 is a detail view illustrating the construction of the cover feed driving pinions, on plane 12 of Figure 2.
Figure 13 is another view partially in section illustrating the construction of the cover feed driving mechanism, on plane 13 of Figure 2.

In the operation of the feeding mechanism just described the cartons $b$ are placed upon the track plate 51 by hand, and the carton feed 54 being driven with a step-by-step movement as hereinbefore described, the fingers 55 move the cartons toward the wheel 87. The wheel 87 having the step-by-step movement imparted to it, as hereinbefore described, locates a recess in a recessed plate 90 opposite the track plate 51 each time the wheel comes to rest, and as the cartons are fed up by the fingers 55 a carton is moved into one of said recesses each time a recess is located opposite the track plate. In the next one-step movement of the wheel the carton is moved to an idle position and in the next one-step movement of the wheel the carton is placed in position to receive a cover that is fed into position by the following mechanism:

A cover track plate 98 is supported at one end upon the die block 39, as illustrated in Figure 9 of the drawings. The opposite end of this cover track plate is supported upon a frame 99, bearings for a sprocket wheel shaft 100 being secured to the track plate 98, said shaft supporting sprocket wheels 101 for a cover feed 102 comprising two sprocket chains supported by said sprocket wheels and also by sprocket wheels supported on a shaft 103 rotatably mounted at the opposite end of the track plate 98 and in bearings secured thereto. The shaft 103 is driven by means of a universal joint and a connecting shaft 104 mounted in bearings in bearing brackets projecting from the side of the support 16, and as shown in Figure 2 of the drawings. The shaft 104 is driven by means of intermeshing pinions, one of which pinions 105 is rigidly connected with a sprocket wheel 106 driven by means of a sprocket chain 107 extending around a sprocket wheel secured to the end of the cam shaft 21, and as shown in Figures 1 and 2 of the drawings. Cover feed fingers 108, not shown in Figure 2 owing to the smallness of the scale, project from the feed chain 102 at suitable intervals to provide for the reception of the covers, the distance between the fingers in fact being somewhat greater than the diameters of the cover. The feed chain 102 travels in grooves 109 in the upper side of the track plate, and the fingers 108 project out of the groove so that the covers may be manually placed upon the feed plate and between successive intervals separated by the feed fingers. The covers are thus carried by the cover feed along the plate and underneath flanges 110 projecting from the sides of the cover plate and forming an opening through which the covers travel to a position at the end of the track plate 98, at which point the fingers 108 are moved around a sprocket wheel and out of contact with the covers. The covers are then moved forward into the opening in the die block 39 by means of a pusher 111 secured to a pusher lever 112 pivotally supported at its upper end in a strap 113 secured to the bracket 29, and as illustrated in Figure 1 of the drawings. The lever 112 is engaged by a crank pin 114 on a pusher actuator wheel 115 mounted in bearings in a support 116 secured to the side of the track plate 98. The shaft of this wheel 115 has a sprocket wheel secured thereto that is connected by a sprocket chain 117 with a sprocket wheel on the shaft 103 and by means of which mechanism the pusher is operated.

The pinion 105 is mounted in a box 118 slidably supported in a bracket 119 secured to and projecting from a side of the support 16, the box 118 being pressed by a spring 120 toward its mating pinion and with sufficient force to cause the pinions to engage for driving purposes under ordinary conditions. The tension of the spring may be adjusted as by means of a tensioning screw 121 suitably mounted in the bracket, and as shown in Figures 12 and 13 of the drawings.

Under ordinary conditions the pinions will mesh for driving purposes, but should any excessive strain be placed upon them, as by the wedging of a cover in its movement along its pathway, the spring 120 will yield and permit the teeth of the pinion to separate to cause the teeth upon one pinion to pass those upon another. When the box 118 has been moved to separate the pinions a stop pin 122 urged by a spring 123 will pass into the opening in front of the box 118 and retain it in this retracted position and the feed of the covers will thus be stopped. The pin 122 may be released, as by a button 124, to permit the feed of the covers to be resumed.

Figure 3:
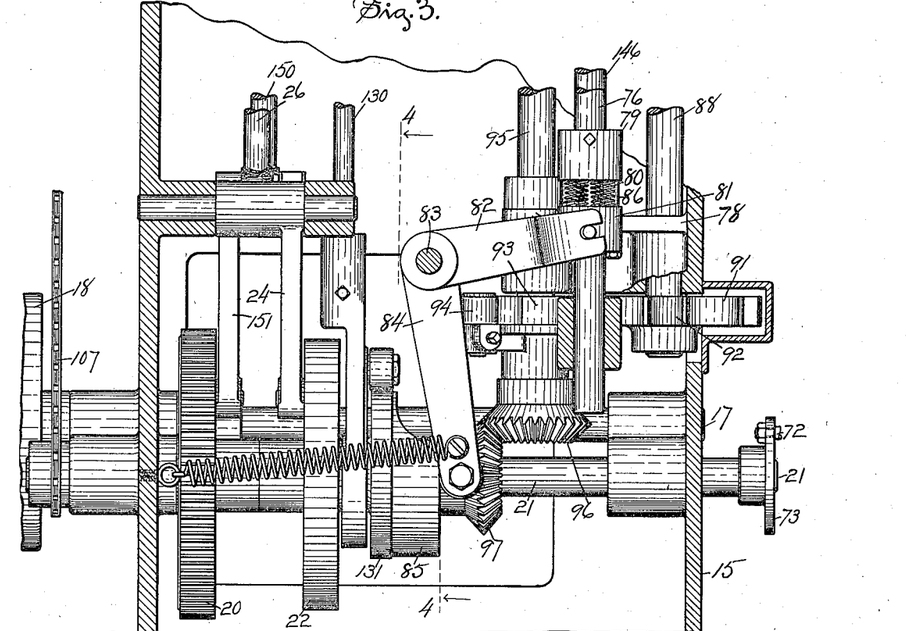
Figure 3 is a detail view, scale enlarged, of the lower end of the machine showing the driving mechanism, and on a plane denoted by the dotted line 3—3 of Figure 4.
Figure 4:
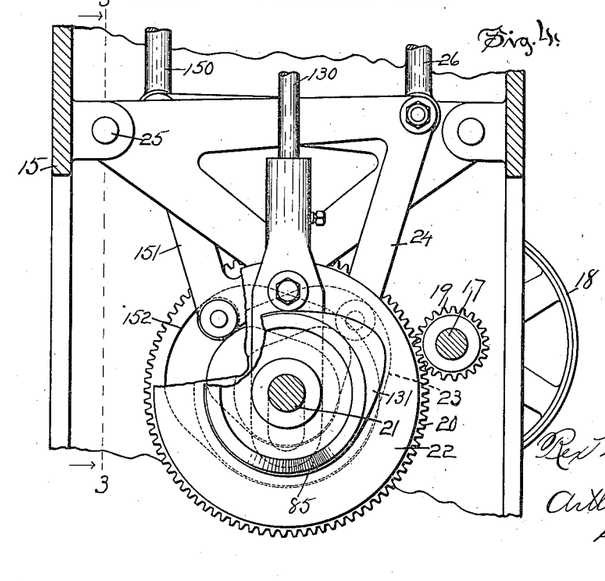
Figure 4 is a view in section on plane denoted by the dotted line 4—4 of Figure 3, with parts broken away to show construction.

A cover holding plunger 125 is mounted for longitudinal reciprocating movement in the guide sleeve 28, the lower end of this plunger being adapted to pass through an opening in the die block 39 to engage the covers after they have been moved into the opening in said die. The plunger 125 has a head connected by links 126 with a plunger operating arm 127 secured to a plunger operating rock shaft 128 mounted in bearings within the support 16. A rock shaft actuating arm 129 secured at one end to the shaft 128 and within the support 16 is pivotally attached to a plunger actuating rod 130 passing downwardly through the support 16 and standard 15 into position for engagement with a plunger actuating cam 131 secured to the cam shaft 21, and as illustrated in Figures 1 and 3 of the drawings. A spring, surrounding the rod 130 and secured at one end to a pin on the lever 129 and at the opposite end to the support 16, may be employed for forcing the rod downwardly, and a spring, surrounding the upper end of the plunger 125, is employed to transmit the force of a head 132 to a shoulder 133 on the plunger, the latter being, therefore, moved through the medium of said spring whereby should any obstacle be interposed to the free movement of the parts the spring will yield without forcing the plunger downward and liability to injure is, therefore, avoided.

In the operation of mechanism thus far described a carton having reached a position c, as hereinbefore described, it will be located directly underneath the plunger 125 and promptly after reaching this position the pusher 111 will move a cover from the plate 98 into the recess in the die block 39 and directly over the opening in the carton. This cover is recessed in its upper surface, as shown in Figure 11, and has an overturned flange providing a deep groove extending around its outer edge, and as shown in said Figure 11, which figure, however, illustrates a subsequent step in the operation, to wit: the step of securing the cover. Immediately after the cover reaches this position the stool 75 is moved upwardly by the mechanism hereinbefore described to carry the carton b and project its upper edge into the groove about the edge of the cover above described. In this position the cover will be in proximity to the lower end of the plunger 125. In this upward movement of the carton its outer surface near the upper edge passes between the carton formers 43 so that the edge is formed to correspond to the shape of the groove in the cover and will, therefore, freely pass into said groove.

In this position of the carton the cover is in proximity to the lower end of the plunger 125, and the stool 75 being now given a downward movement the plunger is also given a downward movement by the mechanism herein set forth and at practically the same rate of movement as that of the stool 75, and consequently the end of the plunger will be pressed against the end of the cover in this downward movement of the carton and the cover will thus be maintained securely in place. Promptly upon the stool 75 reaching this lowermost position another one-step movement is imparted to the wheel 87 and the carton is located in another idle position. In the next one step movement of the wheel the carton and its cover in place are located in position d to have the cover secured by mechanism now to be described.

This mechanism for securing the cover in place is very similar to the mechanism hereinbefore described for placing the cover in the carton, and, therefore, a detailed description will be omitted herein, the description being confined principally to structure not shown in the cover placing mechanism.

An indenting die block 134 is secured to the lower end of a guide sleeve 135, in the manner hereinbefore described with respect to the sleeve 28 and die block 39, and indenting slides 136, preferably four in number, are mounted in dove-tail grooves radially formed in the under surface of the block 134, said slides having dove-tail projections fitting said grooves in a manner that will be readily understood.

The indenting die block 134 has a recess to receive a disc 138 that supports a rectangularly shaped head piece 139, said disc being secured to the die block as by means of screws, and the head piece being secured in place by a bushing 140 screw threaded into the disc. An anvil 141 is secured to the head piece as by means of screws to oppose the thrust of indenting dies 137 secured to die holders 142, the latter being secured in any suitable manner in recesses in the ends of the slides 136. Said slides are operated as by means of slide operating levers 143 comprised in a mechanism and actuated in a manner similar to the cover placing mechanism hereinbefore described, and, therefore, a further and detailed description of the construction and operation of this mechanism is omitted, as it will be readily understood by reference to the mechanism hereinbefore described.

However, the carton does not require as much vertical movement in this position as in the position for receiving the cover, and as the stool 144 is actuated by the same cam 85 as is the stool 75 it is necessary to provide for a more limited movement of stool 144 and its supporting post. To this end I construct the post in two sections 145-146, the latter having a pin 147 projecting into a recess in the lower end of the section 145, and as shown in dotted lines in Figure 8 of the drawings. This permits the lower section of the post to have a certain movement or lost motion independently of the upper section, the latter, therefore, not being operated until the lower section has been moved to some extent and the upper section ceasing its movement and remaining at rest while the lower section completes its movement. A stop collar 57 is adapted to engage a suitable stop in the boss 77 to determine the position of the stool 144 in its lowermost position, and the lower section 146 of the stool actuating post is connected by a forked arm (not shown and similar to the arm 82) to the rock shaft 83 and is consequently operated in unison with the stool actuating post 76, hereinbefore described.

The carrier sleeve 148 of this indenting mechanism is actuated by means of a lever 149, rod 150 and actuating frame 151, as hereinbefore described with respect to the former mechanism, the frame 151, however, being pivoted at the opposite side of the standard 15 from that on which the frame 24 is mounted, and this frame is actuated by means of a roller engaging within a cam groove 152 formed in the side of the gear 20.

In accordance with the provisions of the patent statutes I have described the principles of operation of my invention, together with the device which I now consider to represent the best embodiment thereof; but I desire to have it understood that the device shown is only illustrative, and that the invention may be carried out by other means.

I claim—

1. A machine of the class described comprising carton stations, a carrier to receive cartons and to convey them between said stations, means for placing ends on cartons at one of said stations and while supported by said carrier, and means for securing said ends at another of said stations while still supported by said carrier.

2. A machine of the class described comprising stations, a carrier to receive cartons and to convey them between said stations, mechanism for conveying ends to one of said stations and for placing said ends on cartons and while supported by said carrier at said station, and means for securing said ends at another of said stations while still supported by said carrier.

3. A machine of the class described comprising carton stations, a member to position cartons at said stations, mechanism for delivering cartons to said member, means for placing ends on cartons at one of said stations and while supported by said member, and means for securing said ends at another of said stations and while still supported by said member.

4. A machine of the class described comprising carton stations, a member to position cartons at said stations, mechanism for delivering ends and for placing said ends on cartons at one of said stations and while supported by said member, and means for securing said ends at another of said stations and while still supported by said member.

5. A machine of the class described comprising carton stations, a member to position cartons at said stations, mechanism for delivering cartons to said member, mechanism for delivering ends and for placing said ends on cartons at one of said stations and while supported by said member, and means for securing said ends at another of said stations and while still supported by said member.

6. A machine of the class described comprising carton stations, a member to position cartons at said stations, means for imparting step-by-step movement to said positioning member, and means for delivering ends to cartons on said member in synchronism with said step-by-step movement of said member.

7. A machine for applying ends to cartons and comprising a positioning member, means for performing an operation on cartons on said member, means for imparting step-by-step movement to said member, means for supplying cartons to said member, mechanism for supplying other material to said member, and means for imparting step-by-step movement to said mechanism in synchronism with said step-by-step movement of said member.

8. A machine for applying ends to cartons and comprising a positioning member, means for supplying cartons to said member, means for imparting step-by-step movement to said member, means having a steady movement for feed of material towards said member, and means for translating said steady movement of said material after leaving said steadily moving means into a step-by-step movement synchronous with the movement of said member to deliver said material thereto.

9. A machine for applying ends to cartons and comprising a positioning member, means for supplying material to said member, means for imparting step-by-step movement to said member, means for conveying other material with a regular movement toward said member, and a feed device independent of said regularly moving means to receive the last mentioned material and to deliver it to said member with a step-by-step movement synchronous with the movement of said member.

10. A machine of the class described comprising a carton positioning member, means for operating upon cartons on said member, means for imparting step-by-step movement to said member, means for imparting regular movement to ends toward said member, and a pusher reciprocatingly mounted to deliver ends to said member.

11. A machine of the class described comprising a carton positioning member, means for operating said member to position cartons, a head to receive ends to be placed on cartons in one position of said member, and another head for securing said ends in another position of said member.

12. A machine of the class described comprising a carton positioning member, an end feed comprising an endless member to deliver devices to said positioning member, a shaft for supporting said endless member, a pusher, a rotating shaft operatively connected with said pusher to operate it, and a positive driving connection between said shafts.

13. A machine of the class described comprising a positioning member, means for operating said positioning member, a feed device for supplying material to said member, means for operating said feed device and comprising two intermeshing gears, and means for yieldingly supporting one of said gears in mesh with the other.

14. A machine of the class described comprising a positioning member, means for operating said member, a feed device for supplying material to said member, means for operating said feed device and comprising two intermeshing gears, means for yieldingly supporting one of said gears in mesh with the other, and means for preventing movement of the yieldingly mounted gear when moved away from the other gear.

15. A machine of the class described comprising a die, means for supplying ends to said die, a member to receive cartons, means for decreasing the space between said die and said member to insert the ends of cartons within said ends, and means for thereafter acting upon said carton and ends to secure said ends in place.

16. A machine of the class described comprising a die having a recess to receive the ends of cartons, means for inserting carton ends within said recess, a member to receive cartons, means for decreasing the space between said die and said member to insert the ends of cartons within ends held by said die, and means for thereafter simultaneously operating upon said ends and upon said cartons to secure said ends in place.

17. A machine of the class described comprising a carton seat, means for imparting reciprocating movement to said seat to raise and lower it, means for placing carton ends to be received on the ends of cartons raised by said seat, and means for thereafter simultaneously operating upon said ends and upon said cartons to secure said ends in place.

18. A machine of the class described comprising a carton supporting plate, a seat located in a hole in said plate, means for moving cartons along said plate onto said seat, means for raising and lowering said seat, means to receive the ends of cartons located over said seat, and means for operating upon cartons and upon said ends.

19. A machine of the class described comprising a die block having a recess and a slot extending radially into said recess for insertion of a die therein, a die located in said recess, a carton seat located underneath said die, and means for decreasing the space between said die and seat.

20. A machine of the class described comprising means to receive the ends of cartons, a carton seat, means located on opposite sides of a carton on said seat to form said carton for engagement with a carton end, means for decreasing the space between said seat and end receiving means to engage said end and carton, and means for simultaneously moving said forming means toward each other to engage a carton at its upper edge and fit it for engagement with said end.

21. A machine of the class described comprising means to receive the ends of cartons, a carton seat, carton forming members each shaped to engage a corner of a carton on a side and end on opposite sides of said corner, said forming members being located on opposite sides of a carton, means for decreasing the space between said end receiving means and seat to engage an end with a carton, and means for simultaneously moving said forming members toward each other to engage a carton at its upper edge to fit it for engagement with said ends for cartons.

22. A machine of the class described comprising a die block having a recess to receive the end of a carton, carton formers shaped to fit the corners of cartons and movably mounted to engage the corners of cartons on opposite sides thereof, a carton seat, means for decreasing the distance between said block and seat, means for supplying ends for cartons within the recess in said block, and means for operating said formers to engage cartons and fit the ends thereof for the reception within said ends for cartons.

23. A machine of the class described comprising a carton die having a recess, a carton die block secured within said recess and having a recess for ends for cartons, formers slidably mounted in said die to engage the sides of cartons near their upper edges, a carton seat, means for decreasing the distance between said die and seat, means for supplying cartons within the recess in said block, and means for operating said formers.

24. A machine of the class described comprising means to receive the ends for cartons, means for supplying ends for cartons to said receiving means, a carton seat, means for moving said seat toward and away from said end receiving means, and means for holding an end upon a carton during movement of said seat away from said end receiving means.

25. A machine of the class described comprising means to receive the ends for cartons, means for supplying ends for cartons to said receiving means, a carton seat, means for decreasing the space between said seat and said receiving means to engage cartons with ends therefor, a cover holding plunger, a support for said plunger, and means for retaining said plunger in engagement with ends for cartons during separation movement of said seat and said end receiving means.

26. A machine of the class described comprising means to receive ends for cartons, means for supplying ends for cartons to said receiving means, a carton seat, means for moving said seat away from said end receiving means, a cover holding plunger with means for supporting it, and means for moving said plunger to retain its end in contact with said ends for cartons during the movement of said carton seat.

27. A machine of the class described comprising means to receive the ends of cartons with carton ends thereon, an anvil positioned to be received within recesses in said ends for cartons, indenting slides movably mounted to engage cartons on their opposite sides near their ends, means for operating said indenting slides, carton supporting means movable away from said indenting slides, a plunger to engage carton ends, and means for moving said plunger to maintain contact of its lower end with said carton ends during movement of said support.

28. A machine of the class described including operating heads, means for moving cartons from one to the other of said heads, rests movably mounted to receive cartons underneath said heads, a single actuating member for said rests, and a connection between said member and said rests for imparting greater movement to one of said rests than to the other.

29. A machine of the class described including operating heads, means for moving cartons from one to the other of said heads, rests movably mounted to receive cartons underneath said heads, a rock shaft, operative connections between said rock shaft and said rests, and means for causing partial movement of a portion of the connection between said rock shaft and one of said rests without effect upon said rest.

30. A machine of the class described including operating heads, means for moving cartons from one to the other of said heads, carton rests located underneath said heads, a post to support one of said rests, a post comprising sections one of which is rigidly connected with the other of said rests and the other of which sections is movably engaged with the first section to move independently thereof, and means common to both posts for operating them.

31. A machine of the class described comprising a positioning member, means for imparting a step-by-step rotating movement to said positioning member, a carton seat movably mounted, means for lifting said seat with a carton thereon, means for supplying cartons to said seat, means for supplying and for placing ends on the cartons on said seat in one location of the positioning member, and means for acting upon both said carton and end for securing the end in place in another location of said positioning member.

32. A machine of the class described including operating heads, a positioning member rotatably mounted underneath said heads, means on said positioning member to receive cartons and to position them successively underneath said heads, means on one of said heads to receive ends and place them on cartons, and means on the other of said heads to secure the ends to the cartons.

REX W. McINTYRE.